(No Model.)
J. A. MALONEY.
ELECTROPHORE OR SECONDARY BATTERY.
No. 248,769. Patented Oct. 25, 1881.
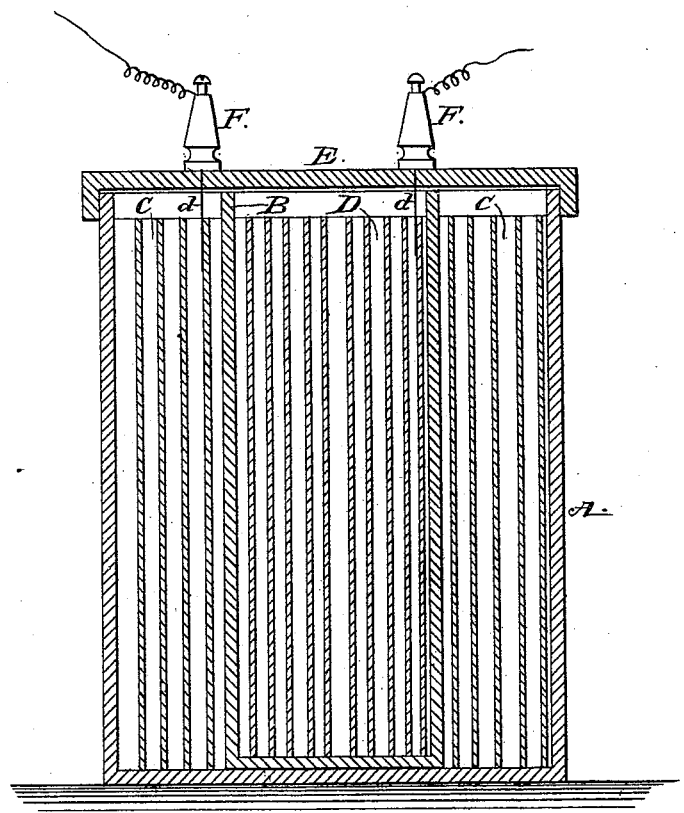

UNITED STATES PATENT OFFICE.

JAMES A. MALONEY, OF WASHINGTON, DISTRICT OF COLUMBIA, ASSIGNOR OF ONE-HALF TO JOHN J. PATTERSON, GARRICK MALLERY, ALEX. H. EVANS, AND RICHARD K. EVANS, ALL OF SAME PLACE.

ELECTROPHORE OR SECONDARY BATTERY.

SPECIFICATION forming part of Letters Patent No. 248,769, dated October 25, 1881.

Application filed August 22, 1881. (No model.)

*To all whom it may concern:*

Be it known that I, JAMES A. MALONEY, of Washington, in the county of Washington and District of Columbia, have invented a new Improvement in Electrophores or Secondary Batteries; and I do hereby declare the following to be a full, clear, and exact description of the same, reference being had to the accompanying drawing, which represents a vertical sectional view of an electrophore or secondary battery.

My invention relates to an improved method of preparing and constructing electrophores, &c.; and it consists in so preparing the plates that the primary process of polarizing before use is entirely dispensed with.

The object of my invention is to render more certain and effective the results sought in electrophores or secondary batteries.

A represents the jar or vessel; B, a porous cup; C, coil of lead in jar and surrounding porous cup B outside; D, sheet or coil of lead within porous cup B; d d, electrodes; E, cap or cover to jar; F F, binding-posts.

In electrophores or secondary batteries where red lead is used to coat the plates the electrophore or secondary battery must pass through the process of polarization—i. e., the red lead upon one plate becomes a dark brown or plum color, while on the other plate it becomes gray or nearly white; and to dispense with the process by which said results are obtained my invention pertains. This I accomplish by painting or coating the sheet intended to be the dark one with commercial peroxide of lead, and the other one, intended to be the light one, with sulphate of lead, after which they are placed in the vessel or jar and porous cup and submerged in acidulated water, whereupon the electrophore, &c., is ready to receive and retain the electric current or energy. Before applying the acid to the water with which the coils are submerged a small quantity of the peroxide or sulphate of lead may be mixed in the water, and after adding the acid the fluid is placed in the porous cup and jar, respectively, with its coil of lead.

I do not herein claim, broadly, the use of a porous cup in an electrophore or secondary battery.

I do not herein claim, broadly, the use of peroxide of lead and sulphate of lead in an electrophore or secondary battery, as that forms a part of another application filed by me.

Having thus described my invention, what I claim as new, and desire to secure by Letters Patent of the United States, is—

In an electrophore or secondary battery, the combination of two leaden plates or coils, the one coated with sulphate of lead and the other with peroxide of lead, each plate having an electrode attached to it, and both plates submerged in acidulated water within a suitable vessel or jar, substantially as and for the purpose set forth.

JAMES A. MALONEY.

Witnesses:
W. M. THOMPSON,
GEO. M. LOCKWOOD.